United States Patent
Akkiraju et al.

(10) Patent No.: US 10,726,466 B2
(45) Date of Patent: *Jul. 28, 2020

(54) SYSTEM AND METHOD FOR RECOMMENDING PRODUCTS TO BRIDGE GAPS BETWEEN DESIRED AND ACTUAL PERSONAL BRANDING

(71) Applicant: International Business Machines Corporation, Armonk, NY (US)

(72) Inventors: Rama K. Akkiraju, Cupertino, CA (US); Haibin Liu, San Jose, CA (US); Jalal U. Mahmud, San Jose, CA (US); Vibha S. Sinha, Santa Clara, CA (US); Anbang Xu, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 780 days.

This patent is subject to a terminal disclaimer.

(21) Appl. No.: 15/342,803

(22) Filed: Nov. 3, 2016

(65) Prior Publication Data

US 2018/0121986 A1 May 3, 2018

(51) Int. Cl.
*G06Q 30/00* (2012.01)
*G06Q 30/06* (2012.01)
*G06F 16/9535* (2019.01)
*G06Q 50/00* (2012.01)

(52) U.S. Cl.
CPC ..... *G06Q 30/0631* (2013.01); *G06F 16/9535* (2019.01); *G06Q 50/01* (2013.01)

(58) Field of Classification Search
CPC .................................. G06Q 30/06–08

USPC ................................. 705/26.1–27.2
See application file for complete search history.

(56) References Cited

U.S. PATENT DOCUMENTS

| | | |
|---|---|---|
| 8,725,728 B1 | 5/2014 | King et al. |
| 8,949,889 B1 | 2/2015 | Erdmann |
| 9,020,864 B2 | 4/2015 | Perkowitz et al. |
| 2006/0085217 A1 | 4/2006 | Grace |
| 2009/0112701 A1 | 4/2009 | Turpin et al. |
| 2012/0095863 A1 | 4/2012 | Schiff et al. |
| 2012/0173324 A1 | 7/2012 | Vallery et al. |
| 2013/0110583 A1 | 5/2013 | Ormont et al. |
| 2013/0246174 A1 | 9/2013 | Davidson et al. |
| 2013/0253980 A1 | 9/2013 | Blom et al. |

(Continued)

FOREIGN PATENT DOCUMENTS

WO     2012108889 A1     8/2012

OTHER PUBLICATIONS

Slaughter, J., "Identifying the Characteristics of a Personal Brand: A Qualitative Study" 2015 (Year: 2015).*

(Continued)

*Primary Examiner* — Ethan D Civan
(74) *Attorney, Agent, or Firm* — Terrile, Cannatti & Chambers, LLP; Michael Rocco Cannatti

(57) ABSTRACT

A method, system and a computer program product are provided for making product recommendations to improve a user's personal brand by using the symbolic meanings and utilities of products and a user's brand perceptions along with users input of a desired personal brand imagery to output a set of products that are optimized to help users bridge the gaps between their desired and actual self-brand, thereby enabling a user to navigate products that shape their personal imagery.

21 Claims, 7 Drawing Sheets

(56) References Cited

U.S. PATENT DOCUMENTS

| | | | |
|---|---|---|---|
| 2014/0032452 A1* | 1/2014 | Perkowitz | H04W 4/21 706/12 |
| 2014/0222530 A1 | 8/2014 | Wegner et al. | |
| 2014/0236622 A1 | 8/2014 | Southam | |
| 2014/0257990 A1* | 9/2014 | Cudgma | G06Q 30/0269 705/14.66 |
| 2015/0081450 A1 | 3/2015 | Bean | |
| 2016/0005083 A1 | 1/2016 | Anand | |
| 2018/0121987 A1* | 5/2018 | Akkiraju | G06Q 30/0631 |

OTHER PUBLICATIONS

Oyserman et al., Possible selves as roadmaps, Journal of Research in Personality 38 (2004) 130-149, 2004.

Jenny Bronstein, Creating possible selves: information disclosure behaviour on social networks, Information Research, vol. 19, No. 1, Mar. 2014

Hoppmann et al., Linking Possible Selves and Behavior: Do Domain-Specific Hopes and Fears Translate into Dailiy Activities in Very Old Age?, Journal of Gerontology: Psychological Sciences, 2007, vol. 62B, No. 2, p. 104-111, 2007.

IBM, Personality Insights, http://www.ibm.com/smarterplanet/us/en/ibmwatson/developercloud/personality-insights.html, downloaded Jul. 13, 2016.

Wang, Y. et al., VeilMe: An Interactive Visualization Tool for Privacy Configuration of Using Personality Traits. In CHI, (2015), 817-826.

Gou, L., et al., Knowme and shareme: Understanding automatically discovered personality traits from social media and user sharing preferences. IBM Research Report RJ10516 (ALM1312-005), Dec. 11, 2013.

Aaker, J. L., Dimensions of Brand Personality, Journal of Marketing Research, 34, Aug. 3, 1997, 347-356.

Dittmar, H., The social psychology of material possessions: To have is to be: Materialism and person perception in working-class and middle-class British adolescents, Hemel Hempstead, Harvester Wheatsheaf, 1992, pp. 233-251.

Radley, A., Book Review for H. Dittmar's The social psychology of material possessions: To have is to be, Journal of Economic Psychology 14 (1993), pp. 453-454.

Cialdini, Robert B. et al., Social influence: Social norms, conformity and compliance. The handbook of social psychology, 2 , (1998), 151-192.

Elliott, R. et al., Brands as symbolic resources for the construction of identity. International journal of Advertising, 17, 2, (1998), 131-144.

Xu, Anbang et al., Predicting Perceived Brand Personality with Social Media, Proceedings of the Tenth International AAAI Conference on Web and Social Media (ICWSM), 2016.

Markus, H. et al., Possible selves. American Psychologist, 41, 9, (1986), 954-969.

Xu, Anbang et al., U.S. Appl. No. 14/839,082, filed Aug. 28, 2015, entitled Brand Personality Inference and Recommendation System.

Xu, Anbang et al., U.S. Appl. No. 14/839,120, filed Aug. 28, 2015, entitled Brand Personality Comparison Engine.

Xu, Anbang et al., U.S. Appl. No. 14/839,178, filed Aug. 28, 2015, entitled Brand Personality Perception Gap Identification and Gap Closing Recommendation Generation.

* cited by examiner

SYSTEM AND METHOD FOR RECOMMENDING PRODUCTS TO BRIDGE GAPS BETWEEN DESIRED AND ACTUAL PERSONAL BRANDING

BACKGROUND OF THE INVENTION

The present application relates generally to an improved data processing apparatus and method. In one aspect, the present application relates to generating recommendations to achieve a desired brand personality perception.

Initially, it should be noted that the term "brand" refers to any designation of a product, service, location, or any other designation of an entity. Brands are often represented by trademarks, service marks, trade dress, or other identifier of a good, service, or source of goods/services. In addition, the term "brand personality" refers to a set of human personality traits or characteristics associated with a brand or trademark. For example, the Apple™ brand is considered by many to be a "young" brand personality while Texas Instruments™ brand is considered by many to be a relatively "old" brand personality. In addition to being useful for promoting business success, brands are often socially significant to individuals or groups who equate various emotions and/or human attributes to the brands which in turn elicit those emotions and/or attributes in the persons consuming the entities associated with the brands. In this way, a brand's personality can create brand identities for a customer that satisfies the customers' self-expression needs. For example, consider the consumption of red wine. While few customers can distinguish taste differences between various red wines, the brands associated with specific wines have different personalities and, when served in a social setting, can make a powerful statement about those who drink them. Moreover, a person's view of the brand's personality can affect the physiological and/or psychological reaction a person has to the product associated with the brand, e.g., the wine may taste better to the person because it is associated with brand A while another wine associated with brand B may be less pleasing. This emotional reaction to brand personality is confirmed with research in social psychology which shows that material possessions have a profound symbolic significance for their owners, as well as for other people. Indeed, the influence of symbolic meanings of material objects on how consumers make choices can be critical to understanding the creation and maintenance of a user's personal and social identity.

While there has been interest in both industry and research communities to predicting human personality from social media data and developing corresponding personalized recommender systems, such recommendation systems typically rely on the predicted human personality identify and recommend products purchased by other similar consumers without taking into account how the relationship between human and brand personality can affect a user's preferences, satisfaction, and their social interactions with others. As a result, existing solutions for generating product recommendations do not make effective use of brand personality information to help consumers navigate the product purchase options.

SUMMARY

Broadly speaking, selected embodiments of the present disclosure provide a recommendation system, method, and apparatus for enabling personal branding by obtaining actual personal brand information input for a user (in terms of how the user is actually perceived by others) and desired personal brand information input from the user (in terms of how the user wishes to be perceived by others) which is then manipulated in vector form to identify any gaps between the actual and desired brand information and to recommend one or more products which bridge the identified personal brand gaps. In selected embodiments, the user's desired personal brand information may be quantified in a data structure defining a hierarchical structure of multiple main goals, each of which consists of one or more sub-goals. With this data structure for the user's desired personal brand information, the recommendation system can consider the relationship among different goals to generate more meaningful product recommendations that help users build and maintain a more consistent personal image (e.g., when a user's goals contradict each other). This data structure for the user's desired personal brand information may also enable users to act on a representative image level (as opposed to the individual goals level) to help users to reduce the cognitive load and make more accurate decisions. In selected embodiments, the recommendation system may be implemented with a computational model which computes the gaps between a user's desired and actual brand imagery and which uses brand imagery for individual products to identify individual product candidates which correlate to the gaps in the user's desired personal brand imagery, where combinations of the product candidates may be optimized for recommendation to the user based on the interaction effects among brand imagery for the individual products. In addition or in the alternative, a browser-based product recommendation interface may be configured to display information identifying the gaps in the user's desired personal brand imagery along with product recommendations to the user which are optimized to bridge the gaps in the user's desired personal brand imagery. By presenting product recommendations along with information identifying the gaps between user's actual and desired personal brand imagery and the severity ratings of the gaps, the user can quickly and efficiently navigate the product recommendations in terms of products' symbolic meanings (e.g., young, masculine) and their relationship to the user's desired personal brand imagery.

The foregoing is a summary that is provided to introduce a selection of concepts in a simplified form that are further described hereinbelow and thus contains, by necessity, simplifications, generalizations, and omissions of detail; consequently, those skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
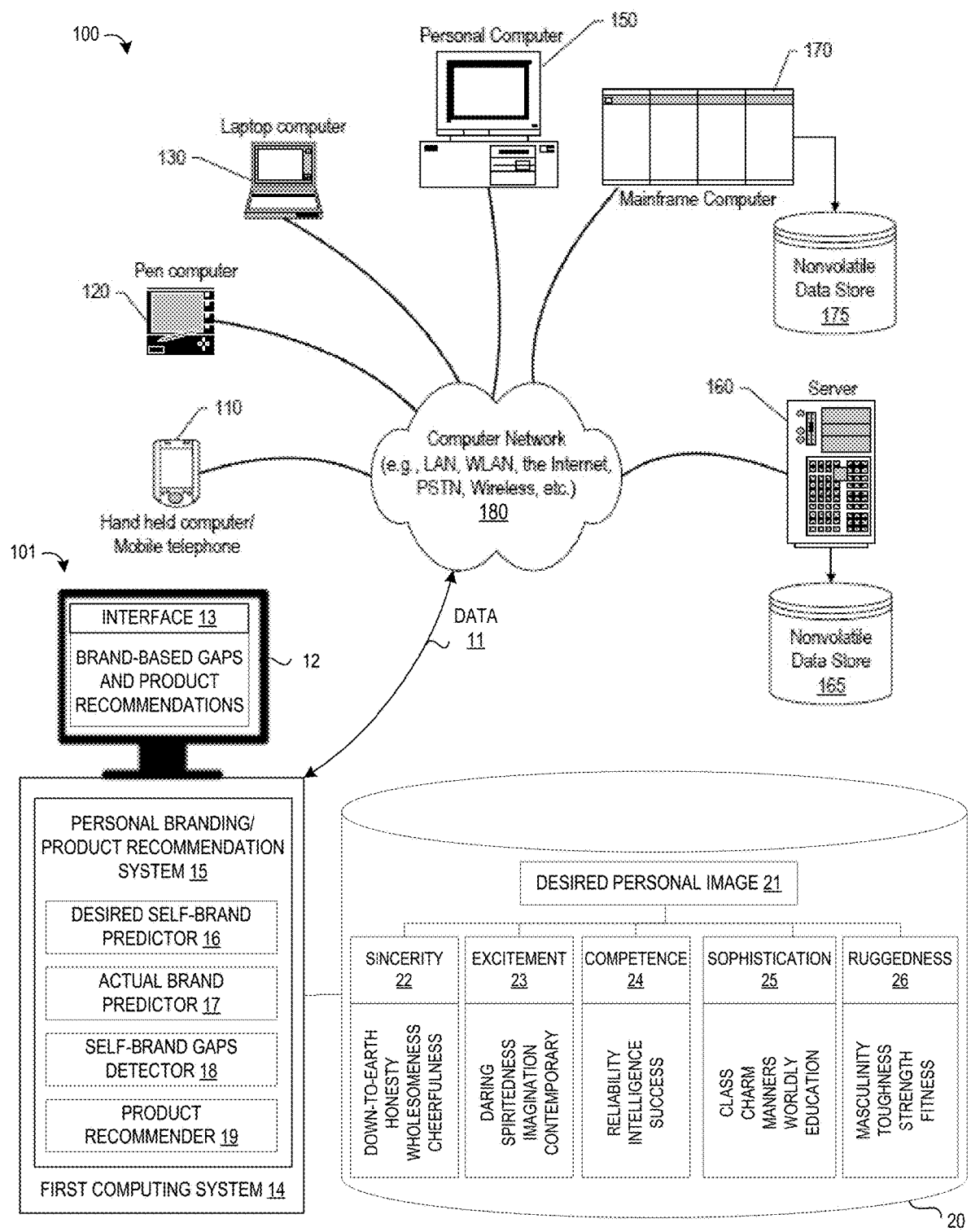
FIG. 1 depicts an example diagram of a distributed data processing system in which aspects of the illustrative embodiments may be implemented.

The present invention may be a system, a method, and/or a computer program product. In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the functionality and operation of a data processing system for helping users create and maintain a personal brand imager by providing recommendations based on each user's perceived images (reality), desired images (goals), and the gaps therebetween.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a distributed data processing system 100 having a network of computing devices (e.g., 110, 120, 130, 140, 150, 160, 170) connected over a network 180 to exchange data 11 with a data processing system 101 having a first computing system 14 and associated display screen 12 for displaying a user interface 13. The depicted network 180 is the medium used to provide communication links between various devices and computers connected together within distributed data processing system 100, and may include one or more wired and/or wireless data communication links, where each communication link may comprise one or more of wires, fiber optic cables routers, switches, transmitters, receivers, or the like. At the data processing system 101, a personal branding product recommendation system 15 is configured to generate brand-based gaps and product recommendations for display on the interface 13 of the display screen 12. In some illustrative embodiments, first computing system 14 may be embodied as the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data stored in the knowledge base 20. Based on the application of the queries to the corpus of data, a set of hypotheses, or candidate answers to the input question, are generated by looking across the corpus of data for portions of the corpus of data that have some potential for containing a valuable response to the input question.

As shown in FIG. 1, one or more of the computing devices, e.g., server 101, may be specifically configured to implement a personal branding product recommendation system 15. The configuring of the computing device may comprise the providing of application specific hardware, firmware, or the like to facilitate the performance of the operations and generation of the outputs described herein with regard to the illustrative embodiments. In addition or in the alternative, the configuring of the computing device may include storing software applications in one or more storage devices and loaded into memory of a computing device, such as server 101, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates personal branding through the generation of recommendations for performing actions to improve the perception of a user's personal brand by closing the gap between the actual or perceived brand personality and the user's desired brand personality. In some illustrative embodiments, the personal branding product recommendation system 15 may further interface with other computing devices to initiate operations to perform the recommended actions so as to improve brand personality perception and close the gap.

The personal branding/product recommendation system 15 infers a user's actual brand personality and a desired self-brand personality from user information, such as user behavior data from social media interactions, user personal imagery surveys, product purchase data, user-specified product functionality (e.g., price range, required features, customer review ratings, etc.). In addition, the user's desired self-brand personality may be inferred by surveying the user for generalized brand or image goals, such as by allowing a user to select a self-brand from a set of representative persona-style self-brands (e.g., young, masculine, and classic). As an option to processing self-reported user information, the personal branding/product recommendation system 15 may infer actual and desired self-brand personality information from the users' friends by soliciting information on how they perceive the user on a human personality measure. However collected, the actual and desired self-brand personality information may be converted to vector representation which quantifies the relationships between brands and their corresponding brand personalities. To this end, the personal branding/product recommendation system 15 may be provided with a desired self-brand predictor 16 which collects and analyzes user information and user-specified brand or image goals using prediction models to quantify the user's desired self-brand into a set of dimensions or vectors. In similar fashion, the personal branding/product recommendation system 15 may also include an actual brand predictor 17 which collects and analyzes user information using prediction models to quantify the user's actual brand into a set of dimensions or vectors.

In selected embodiments, the desired self-brand predictor 16 is operative to construct a desired personal image 21 as a hierarchical structure of goals 22-26 which enables consideration of the relationship among goals. Stored in the knowledge base 20, the hierarchical structure of the desired personal image 21 may include several main goals as representative images 22-26, where each goal consists of several sub-goals. For example, the "Sincerity" main goal 22 includes the sub-goals "Down-to-Earth," "Honesty," "Wholesomeness," and "Cheerfulness." In addition, the "Excitement" main goal 23 includes the sub-goals "Daring," "Spiritedness," "Imagination," and "Contemporary." In addition, the "Competence" main goal 24 includes the sub-goals "Reliability," "Intelligence," and "Success," while the "Sophistication" main goal 25 includes the sub-goals "Class," "Charm," "Manners," "Worldly," and "Education", and the "Ruggedness" main goal 26 includes the sub-goals "Masculinity," "Toughness," "Strength," and "Fitness." By using representative images in the hierarchical structure for the desired personal image 21, the relationship between goals can be considered to generate more meaningful product recommendations in cases where user goals may contradict one another, thereby helping users build and maintain a more consistent personal image. In addition, by acting at the representative images level (not at the individual goals level), the cognitive load on the users can be reduce, leading to more accurate decisions.

The personal branding/product recommendation system 15 further operates to identify gaps between a user's actual and desired self-brand imagery. That is, the personal branding/product recommendation system 15 may be provided with a vector processing functionality for computing the gaps or deficiency between a users' actual and desired self-brand imagery. In operation, the personal branding/product recommendation system 15 compares the vector representations of the user's actual and desired self-brand personalities. To this end, the personal branding/product recommendation system 15 may be provided with a self-brand gaps detector 18 which compares the user's actual brand imagery (human personality) to the user's desired imagery (brand personality) by using a transformation matrix M to transform the human personality vector H into a shared dimensional space with the brand personality vector B, and then computing a similarity measure to calculate the gaps between the user's actual and desired self-brand imagery.

Furthermore, the personal branding/product recommendation system 15 may further operate to provide recommendations for bridging the self-brand gaps identified by the self-brand gaps detector 18. That is, given the self-brand gaps determined as mentioned above, a severity of the self-brand gaps is calculated to determining the amount of difference between the actual and desired self-brand imagery. Product recommendations for bridging the detected self-brand gaps are then determined based on the amount of change achieved to more closely approach the intended or desired self-brand personality. The solutions may be ranked based on the severity of the gaps, the brand's relationship with other brands, and the like. Multiple product recommendations may also be combined together to form a composite product recommendation that the user may navigate and/or consider. To this end, the personal branding/product recommendation system 15 may be provided with a product recommender 19 which uses an individual product candidate generator which computes brand personalities for all the products in the database and ranks them based on the distance (e.g., Euclidean distance) between a product's brand personality and the user's desired imagery. In addition, the product recommender 19 may be configured with a product combinatorial optimizer which ranks the various combinations of products on the basis of how each combination of product brand personalities helps the user realize a desired self-brand personal imagery.

Thus, as shown in FIG. 1, the branding/product recommendation system 15 may include a desired self-brand predictor 16, an actual brand predictor 17, a self-brand gap detector 18, and a product recommender 19. The desired self-brand predictor 16 comprises logic to perform operations, as described in more detail hereafter, for assessing various multi-modal sources, such as text, audio, and video, generated by the user and/or the user's friends, to infer or predict the user's desired self-brand imagery for output in vector form. The actual brand predictor 17 comprises logic to perform operations, as described in more detail hereafter, for assessing various multi-modal sources, such as text, audio, and video, generated by the user and/or the user's friends, to infer or predict the user's actual or perceived brand imagery for output in vector form. The self-brand gap detector 18 comprises logic to perform operations, as described in more detail hereafter, for comparing the vector representations of the user's actual and desired self-brand imagery to use the similarities and differences in brand personalities to identify the self-brand gaps between an actual brand personality and the desired self-brand brand personality at an aggregate level and at a constituent level. The product recommender 19 comprises logic to perform operations, as described in more detail hereafter, for automatically evaluating the self-brand personality gaps and performing simulation using product brand personality models to identify product recommendations for bridging the self-brand gaps based on the results of the simulation.

As noted above, the mechanisms of the illustrative embodiments utilize specifically configured computing devices, or data processing systems, to perform the operations for personal branding assessment and product recommendation. These computing devices, or data processing systems, may comprise various hardware elements which are specifically configured, either through hardware configuration, software configuration, or a combination of hardware and software configuration, to implement one or more of the systems/subsystems described herein. For example, selected embodiments of the present disclosure can be implemented in whole or in part with different types of information handling systems that can range from small handheld devices, such as the handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, server 160, and mainframe computer 170. As shown, the various information handling systems can be networked together using computer network 180. Types of computer network 180 that can be used to interconnect the various information handling systems include Personal Area Networks (PANs), Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores. For example, server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
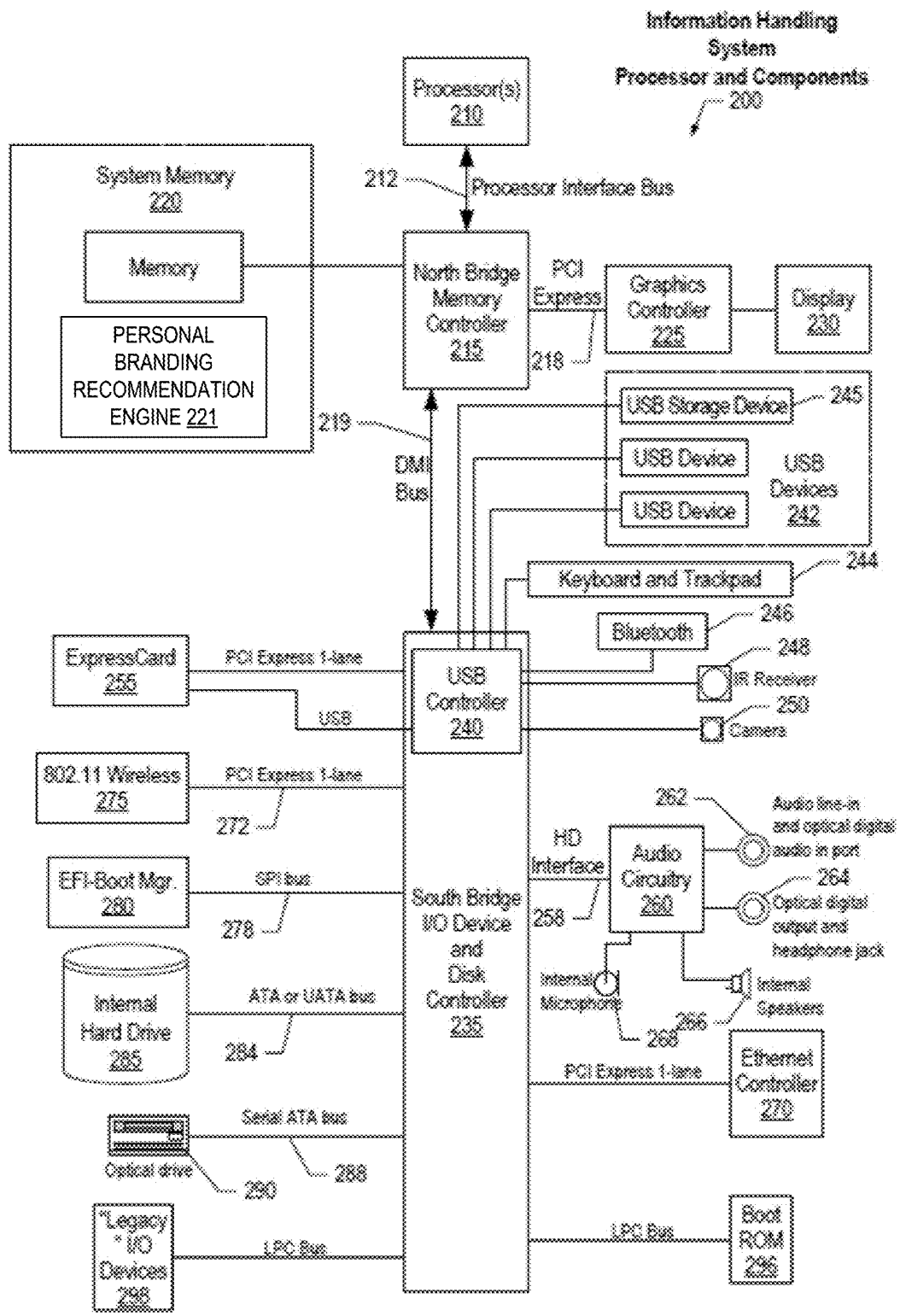
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory devices, including a personal branding recommendation engine 221 which may be invoked to process user input of desired personal brand/imagery along with actual personal brand/imagery to identify brand/imagery gaps therebetween which are processed on the basis of symbolic meanings for products to identify product recommendations to help bridge the brand/imagery gaps, alone or in combination with indications of the severity of the brand/imagery gaps. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
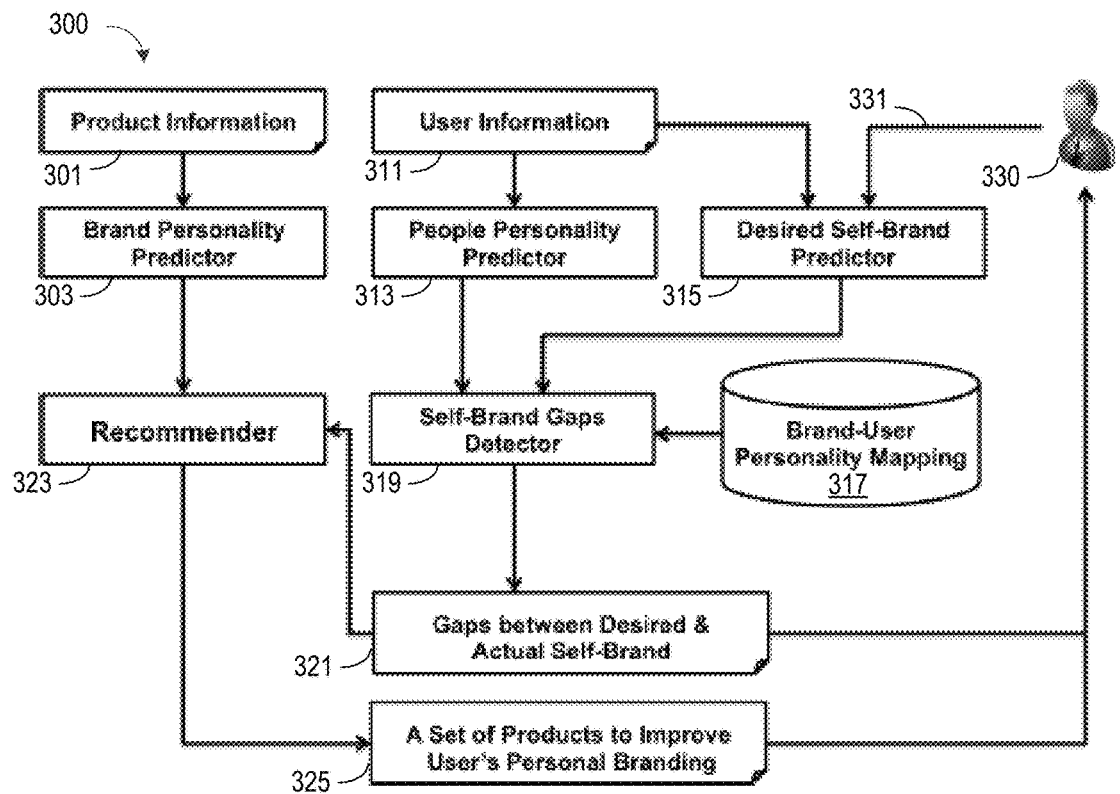
FIG. 3 is a diagrammatic overview of a personal branding system in accordance with selected embodiments of the present disclosure.

To provide additional details for an improved understanding of selected embodiments of the present disclosure, reference is now made to FIG. 3 which depicts a diagrammatic overview of a personal branding system 300 which processes input product information 301 and user information 311, alone or in combination with additional brand or image goal input feedback 331 from the user 330. The processing shown in FIG. 3 may be performed by a cognitive system, such as the first computing system 14 or other natural language processing system.

In selected embodiments, the personal branding system 300 includes a brand personality predictor 303 which receives the product information 301 which may include natural language content submitted from one or more information sources to describe the products' utilities. For example, the product information 301 for a set of products may include product descriptions, product categories, review ratings, and discussions related to the products on social media. At the brand personality predictor 303, symbolic meanings for each product brand may be derived by extracting features associated with a brand from the product information 301 which may be analyzed in accordance with a brand personality model configured to predict a brand personality for the brand based on the features associated with the brand. In addition, the brand personality predictor 303 may be configured to generate a brand personality data structure representing a perceived brand personality for the product in vector form for output to indicate aspects of the product's brand personality based on the inferred brand personality data structure.

In addition, the personal branding system 300 may include a people personality predictor 311 which receives the user information 311 which may include behavior data and/or personality attributes from the user that is collected from the user's personal devices, emails, blogs, social media, or other communications sites, such as textual or interaction data collected from the user's Twitter tweets and Facebook Likes. The user information 311 may also include user-specified personal imagery collected from the user 330 via surveys. Collected over specified time periods, the input user information 311 contains information relating to the user's perceived or actual images (reality) and desired images (goals). At the people personality predictor 313, the human personality characteristics, needs, and values for one or more users may be derived by extracting and analyzing a spectrum of personality attributes to help discover actionable insights about people and entities, and in turn guides end users to highly personalized interactions. In an example embodiment, IBM Watson's Personality Insights service (www.ibm.com/watson/developercloud/personality-insights.html) may analyze the user information 311 to calculate human personality. In addition or in the alternative, the human personality can also be directly collected from self-report surveys from uses. However collected, the people personality predictor 313 may be configured to generate a people personality data structure representing the perceived or actual (reality) brand personality for the user in vector form for output to indicate aspects of the user's actual brand personality based on the inferred people personality data structure.

The personal branding system 300 also includes a desired self-brand predictor 315 which receives the user information 311, alone or in combination with user feedback 331 which may include user-specified input for their desired imagery which may be simplified based on a set of representative images. At the desired self-brand predictor 315, the user's intended or desired images may be derived from input user information 311 collected over specified time periods pertaining to the user's behavior data and/or desired personal imagery data collected through surveys, such as by using brand personality scales. However collected, the desired self-brand predictor 315 may be configured to generate a desired self-brand data structure representing the desired (goals) brand personality for the user in vector form for output to indicate aspects of the user's desired brand personality based on the desired self-brand data structure.

Figure 4:
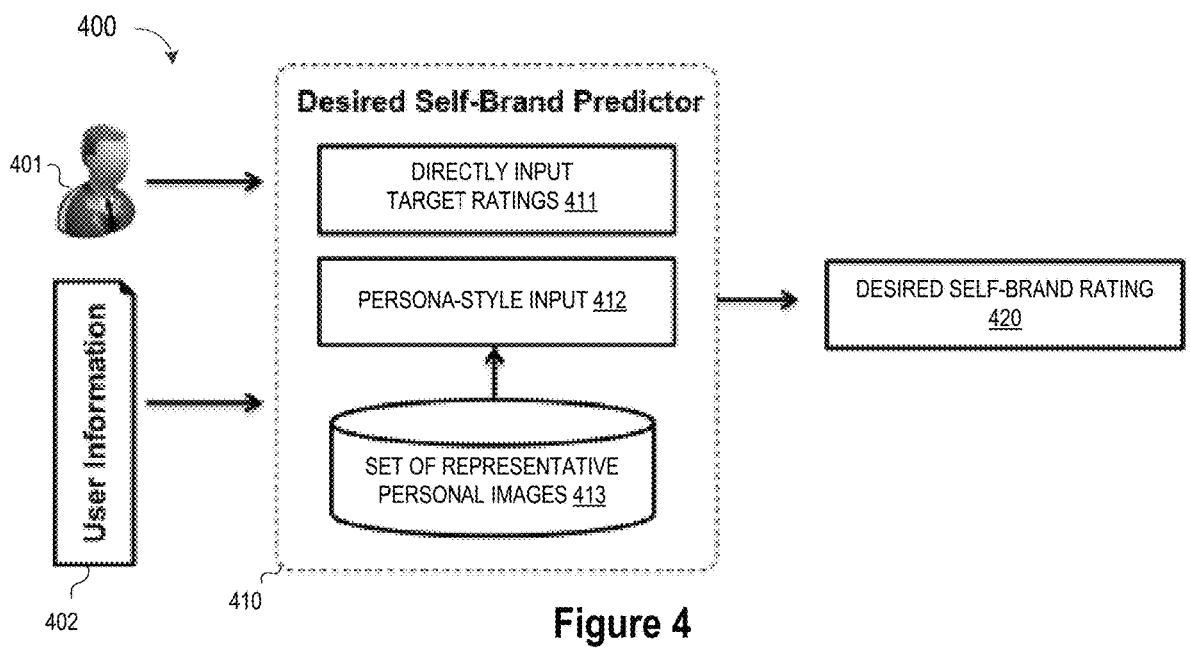
FIG. 4 is a block diagram illustration of a desired self-brand predictor subsystem in accordance with selected embodiments of the present disclosure.

To provide additional details for an improved understanding of selected embodiments of the present disclosure, reference is now made to FIG. 4 which depicts a block diagram illustration 400 of a desired self-brand predictor 410 which processes user information 402 (e.g., the users' behavior data from social media), alone or in combination with additional brand or image goal input from the user 401 (e.g., user input collected through brand personality scale surveys), to generate representative desired self-brand rating or imagery 420 for the user 401. The processing shown in FIG. 4 may be performed by a cognitive system, such as the first computing system 14 or other natural language processing system. Wherever implemented, the desired self-brand predictor subsystem 410 may include a first module sub-system 411 to enable the user to directly input target brand ratings for the user's desired self-brand. Typically used by users with advanced skills, the first module subsystem 411 provides an input interface so that the user can directly assign brand ratings to each dimension in the desired self-brand rating vector 420.

Figure 5:
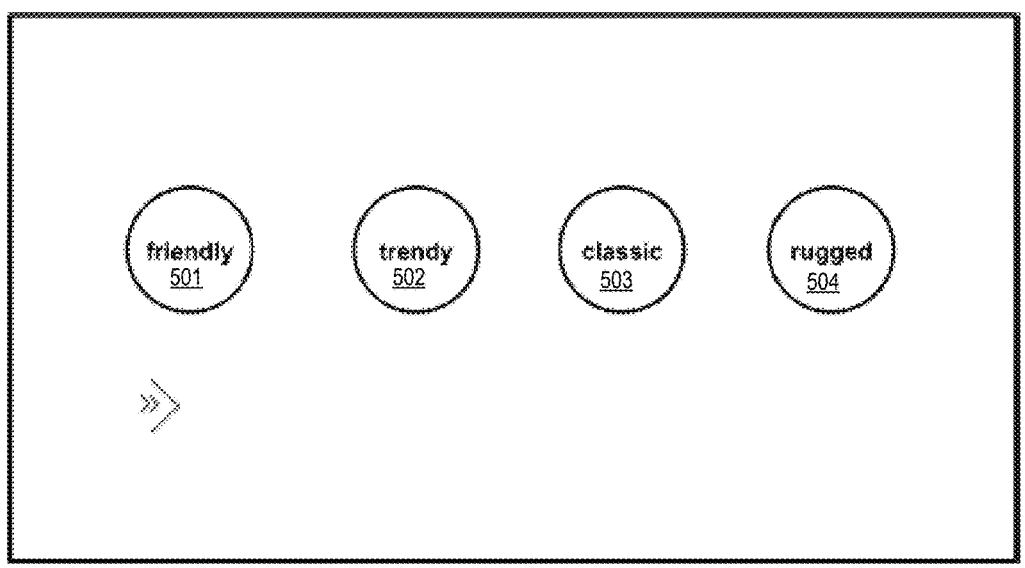
FIG. 5 is a simplified illustration of a user interface for providing user input to select a desired self-brand from a set of representative self-brands in accordance with selected embodiments of the present disclosure.

Since the desired self-brand rating vector 420 can have a large number (e.g., 40) of dimensions, the desired self-brand predictor subsystem 410 may also include a persona-style input subsystem 412 which enables users to input their desired personal imagery (e.g., young, masculine, and classic) using representative desired imagery in order to simplify the user input process by selecting from a small number of representative images instead of directly assigning ratings to every dimension in the desired self-brand rating vector 420. To this end, the persona-style input subsystem 412 may include one or more cluster models which are applied to the user information 402 and/or survey data collected from the user 401 in order to generate a comprehensive taxonomy of the user's desired personal imagery. An example of how the taxonomy is used to simplify the user input is shown in FIG. 5 which depicts a simplified illustration of a user interface 500 for providing user input to select a desired self-brand from a set of representative self-brands (e.g., (e.g., "friendly" 501, "trendy" 502, "classic" 503, or "rugged" 504) instead of requiring that the user directly assigning ratings to every dimension in the self-brand rating vector 420. To generate the set of representative self-brands 501-504 for selection by the user 401, the persona-style input subsystem 412 is connected to receive and process the survey data collected from the user 401 or extracted from the user information 402 as ground truth to model the user's 401 desired personal imagery. To this end, the persona-style input subsystem 412 can apply dictionary-based techniques and topic modeling techniques to the user behavior data (e.g., their textual data collected from social media) and/or answers to surveys on desired self-brands collected from one or more users to extract linguistic and semantic features, and then apply supervised learning techniques to predict desired self-brand ratings 420 for the user's desired personal imagery. For example, structured prediction models may be trained using the survey answers from the user(s) 401 and user information 402 to address the interrelations of predicted variables. Once the prediction models are created, user behavior data extracted from the user information 402 is input to the desired self-brand predictor subsystem 410 to generate a set of representative desired self-brands by clustering the survey data and the output of the trained prediction model(s). In this way, each user 401 may be prompted to input their desired imagery based on a set of simplified or representative personal images 413 (e.g., self-brands 501-504 shown in FIG. 5). The desired self-brand predictor subsystem 410 then outputs a user's desired self-brand rating vector 420 which quantifies the user's desired personal imagery with a set of dimensions representing the desired (goals) brand personality for the user in vector form.

Referring back to FIG. 3, the personal branding system 300 may include a self-brand gaps detector 319 to detect gaps between the user's desired and actual self-brands. To this end, the self-brand gaps detector 319 is connected to receive and process a vector representation of the perceived or actual (reality) human personality from the people personality predictor 313. The user's human personality can also be directly collected from their self-report surveys. The self-brand gaps detector 319 is also connected to receive and process a vector representation of the desired (goals) brand personality from the desired self-brand predictor 315. However, before processing the vector representations of the user's actual and desired self-brands, the vector representations may need to be transformed into a shared dimensional space if the brand and human personality are measured in different dimensions, such as can occur when the human personality itself cannot effectively capture the symbolic meanings of products. For instance, people use brands to define how young or old they are, how masculine or feminine they are, how upscale or downscale they are, and how different or similar to members of their social groups, but when these brand personality traits are not captured in human personality measures, the self-brand gaps detector subsystem 319 may be configured to project these measures to a shared dimension space in order to calculate the self-brand gaps.

To map the brand and human personality measures into a shared dimension space, the personal branding system 300 may include a brand-user personality mapping database 317 which stores a transformation matrix M for transforming the human personality vector H into a shared dimensional space with the brand personality vector B so that a similarity measure can be used to calculate the gaps between the user's actual and desired self-brand imagery. For example, the brand personality measure may be defined as $B \in R^m$, and the human personality measure may be defined as $H \in R^n$, where m and n are the number of dimensions of a feature vector (e.g., m=42 and n=56). To map the brand and human personality measures into a shared dimension space, the transformation matrix M is defined which satisfies the vector transformation equation B=M×H as follows:

$$\begin{bmatrix} b_1 \\ b_2 \\ \vdots \\ b_m \end{bmatrix} = \begin{bmatrix} M_{11} & M_{11} & \ldots & M_{1n} \\ M_{21} & M_{21} & \ldots & M_{2n} \\ & \vdots & & \\ M_{m1} & M_{m1} & \ldots & M_{mn} \end{bmatrix} \begin{bmatrix} h_1 \\ h_2 \\ \vdots \\ h_n \end{bmatrix}$$

For each $b_i = M_i H$, a standard multiple linear regression model can be created to learn the coefficients $M_i$. Alternative, a multivariate multiple regression model can be adopted to learn all the coefficients at one time. Regression models can use the user's behavior data (e.g., purchase historical data) to establish the transformation matrix M. For example, the user's human personalities can be computed from their Twitter tweets and the brand personality of their purchased products, respectively. Then, the user's human personalities and their product's brand personalities are used together to learn the coefficients (M). In addition to using regression techniques, Canonical Correlation Analysis can also be applied to project both brand and human personality measures to k dimensions, where k is less than m and n.

Once the brand-user personality mapping database 317 is stored, the self-brand gaps detector 319 uses the mapping to project the brand and human personality measures to the same dimensions, such as by calculating the user's human personality H and transforming the user's human personality to the user's desired self-brand B based on the mapping M. Alternatively, both a user's human personality H and desired self-brand B (brand personality) may be projected onto a shared dimension. Once the brand and human personality measures are projected onto a shared dimension space, the self-brand gaps detector 319 calculates gaps between the user's desired personal imagery and actual human personality. In selected embodiments, the self-brand gaps detector 319 uses similarity measures, such as Pearson's correlation and Euclidean distance, to calculate and output the gaps between users' actual and desired self-brand 321.

The personal branding system 300 also includes a recommender sub-system 323 that processes the symbolic brand meanings of the available products provided by the brand personality predictor 303 along with the calculated gaps between the desired and actual self-brand 321 to output a set of product recommendations 325 that are optimized to help users bridge the gaps between their desired and actual self-brand, thereby improving the user's personal branding. In selected embodiments, the set of product recommendations 325 are fed back to the user 330 with product recommendations and corresponding gap severity measures so that the user 330 can explicitly navigate products that shape their personal imagery in terms of how young or old they are, how masculine or feminine they are, and how upscale or downscale they are.

Figure 6:
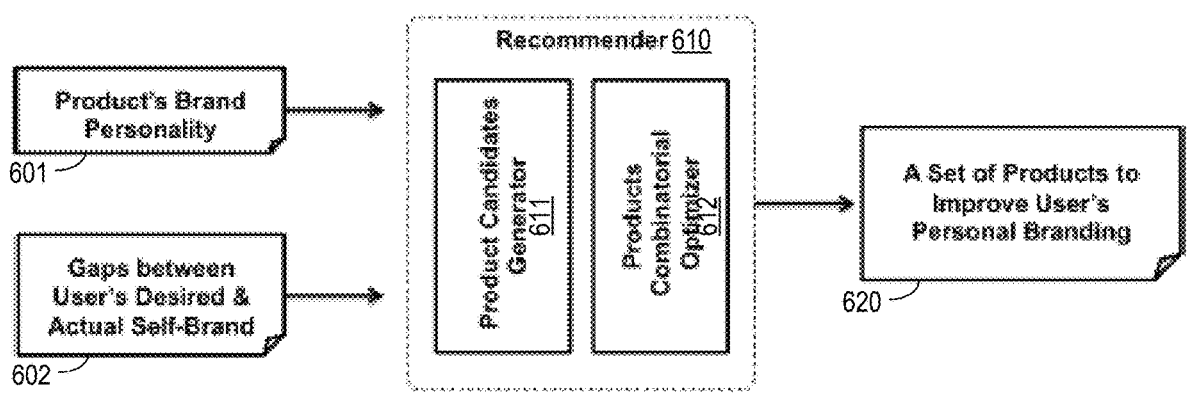
FIG. 6 is a block diagram illustration of a product recommendation subsystem in accordance with selected embodiments of the present disclosure.

To provide additional details for an improved understanding of selected embodiments of the present disclosure, reference is now made to FIG. 6 which depicts a block diagram illustration 600 of a product recommendation subsystem 610 which receives and processes product brand personality information 601 (e.g., vector representations of the products' symbolic meanings generated by the brand personality predictor 303) and the identified gaps between the user's desired and actual self-brand 602 (e.g., vector representations of the gaps 321 between the user's actual and desire self-brands generated by the self-brand gaps detector 319) to generate the set of product recommendations to improve the user's personal branding 620. The processing shown in FIG. 6 may be performed by a cognitive system, such as the first computing system 14 or other natural language processing system. Wherever implemented, the product recommendation subsystem 610 may include and individual product candidates generator 611 and a products combinatorial optimizer 612.

In selected embodiments, the individual product candidate generator subsystem 611 processes the product's brand personalities 601 in the database to rank them based on a similarity measure (e.g., a Euclidean distance) between each product's brand personality and the user's desired imagery. In order to compute brand personality at the product level, the brand personality predictor 303 (FIG. 3) may include a brand personality inference engine which collects survey data of brand personality at the product level and develops regression models that can make predictions from the product information, such as product descriptions, reviews and related online discussions. In selected embodiments, the brand personality inference engine extracts features associated with a brand from received crowdsource information (e.g., natural language content submitted by a plurality of providers) and then analyzes the extracted features in accordance with a brand personality model configured to predict a brand personality for the brand based on the features associated with the brand. In this way, the brand personality predictor 303 generates an inferred brand personality data structure representing a perceived brand personality of providers providing the crowdsource information, and the resulting output of the product brand personality 601 that is provided to the recommender 610 indicates aspects of the perceived brand personality based on the inferred brand personality data structure.

In addition to considering the product symbolic meanings (e.g., brand personality) in the product brand personality 601, the individual product candidate generator subsystem 611 can be extended to consider one or more additional latent factors (e.g., a utility preference). In a case where a user wants to project himself/herself as a "cool" person, the user chooses Apple products because Apple is perceived to be "cool" and also because the Apple product is quite solid in quality. Here, the symbolic meaning of being "cool" can be the personality match, while the consideration of "product quality" is a utility preference, though it will be appreciated that any suitable utility preference (e.g., price) can be put into such latent considerations. In order to consider additional latent factors, the product candidate generator subsystem 611 can utilize a hybrid approach, such as combining a regression model and matrix factorization in the subsystem 611. With this hybrid approach, a user's brand preferences can be determined by their personality relationship and other potential preferences as well by using the regression models to determine the personality relationship, and using the matrix factorization technique to calculate other potential factors, such as the latent utility preference. Given a user's purchase historical matrix (users×products), the matrix can be decomposed into two latent matrixes, where one represents the user's characteristics in the latent space and where the other represents the brand's characteristics. Matrix factorization can be leveraged to perform the matrix decomposition. The missing value in the purchase historical matrix can be interpreted as "not interested" or "not rated yet." Matrix factorization focuses on penalizing and regularizing the existing relationships, and ignores the missing relationships. The result of such decomposition can be used to predict users' preference towards unrated brands.

In selected embodiments, the individual product candidate generator subsystem 611 can put both the personality matches and other preferences in a weighted manner to rank the users' interests about the products and generate product candidates.

In selected embodiments, the products combinatorial optimizer subsystem 612 processes the output from the individual product candidate generator subsystem 611 to find the best combination of products that help users realize their desired personal imagery by considering the relationship among products in terms of their brand personalities. In addition to considering buying or use associations of products, the products combinatorial optimizer subsystem 612 considers the interaction effects of multiple products' personalities. For example, product A can help users to be perceived as young, while product B can make them perceived to be old, so the use of both of the products could weaken their effects on the user's personal imagery. Also, when a user uses more products that serve the same purpose, the aggregated effects of the products may decrease (e.g., the effects of diminishing marginal utility). Theoretically, the aggregated effects of products on a user's imagery should take into account both the product's individual personalities and the interaction effects among them. In order to consider the relationship among products in terms of their brand personalities, the products combinatorial optimizer subsystem 612 may be configured to compute the following general criterion to characterize the aggregated effects of a set of products on personal imagery:

$$BrandsEffect(P) = \frac{1}{d}\sum_{p_i \in P}\vec{W_1}I(p_i) + \vec{W_2}G(P)$$

In this defined criterion, P represents a set of product, and d is the number of products in the set. In addition, I and G are the product functions at individual level and group level respectively, with I being the individual function to compute the brand personality of an individual product, and with G being the group function to calculate the interaction effects among the product's personalities, such as the correlation among them. In addition, $\vec{W}_1$ is the weight vector for individual products, and $\vec{W}_2$ is the weight vector for the interaction effects. These weights can be initially learned from user's behavior data (e.g., purchase historical data) and then can be iteratively refined by user's feedback on product recommendations.

Using this defined BrandsEffect(P) criterion, the products combinatorial optimizer subsystem 612 may be configured to compute an optimal set of products which minimizes the distance between the brand effects of the products and the self-brand gaps. The minimization criterion is:

$$\{p_1, \ldots p_d\} = \operatorname{argmin}_P(\|BrandsEffect(P) - SelfBrandGap\|),$$

where SelfBrandGaps refers to self-brand gaps (the gaps between the user's desired and actual self-brands). To solve this combinatorial optimization problem, the products combinatorial optimizer subsystem 612 may employ heuristic techniques, such as genetic algorithms and simulated annealing.

Figure 7:
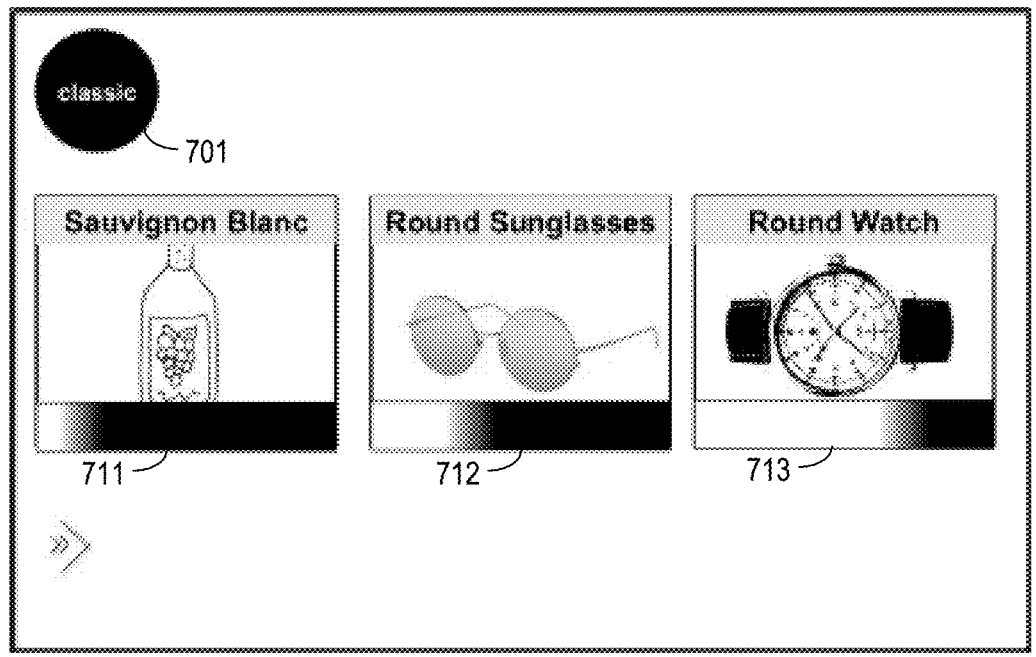
FIG. 7 is a simplified illustration of a user interface for displaying product recommendations which bridge the self-brand gaps to allow users to explore products based on their symbolic meaning in accordance with selected embodiments of the present disclosure.

Referring back to FIG. 3, the recommended set of products to improve the user's personal branding 325 may be displayed to the user 330 on a user interface as a set of optimized products along with their associated effects on personal imagery. To provide an illustrative example of such a product recommendation, reference is now made to FIG. 7 which depicts a simplified illustration of a user interface 700 for displaying product recommendations 711-713 which bridge the user's self-brand gaps to allow the user to explore products based on their symbolic meaning. In the depicted example, the user interface 700 presents a set of optimized products which are selected on the basis of their associated effects on the user's desired "classic" personal imagery 701. In this example, the recommended products are displayed with graphical representations for "Sauvignon Blanc" 711, "Round Sunglasses" 712, and "Round Watch" 713.

Figure 8:
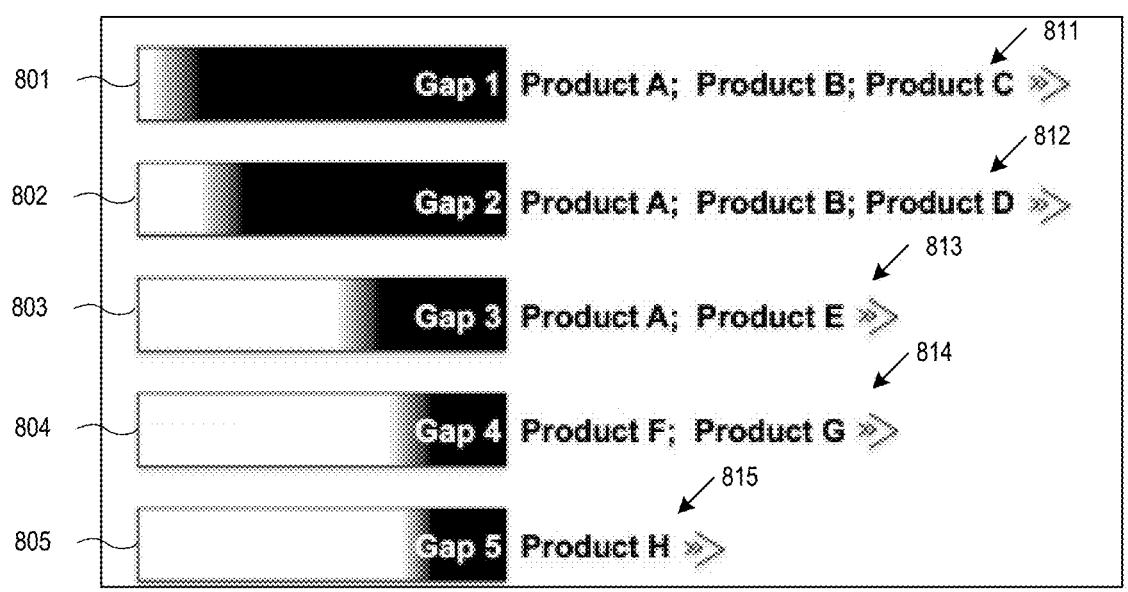
FIG. 8 is a simplified illustration of a user interface for displaying self-brand gaps on specific traits along with corresponding product recommendations in accordance with selected embodiments of the present disclosure.

In another illustrative example of a product recommendation shown in FIG. 8, a user interface 800 may be configured to display brand gaps 801-805 on specific traits along with corresponding product recommendations 811-815 which bridge the user's self-brand gaps. In the depicted example, the user interface 800 presents a visual representation of the individual trait level gaps ranked by severity, along with an indication of the severity of each gap. For example, the shading for Gap 1 801 indicates that the indicated trait (e.g., "young") has the most serious gap, while the shading for Gap 2 802 indicates that gap for the indicated trait (e.g., "intelligent") is less serious, and so on.

Next to each identified gap (e.g., Gap 1 801), a set of optimized products (e.g., 811) are displayed on the basis of their associated effects on bridging the corresponding gap in the user's desired personal imagery 801. In this example, the product recommendations 811 (Product A, Product B, and Product C) are recommended to the user for addressing Gap 1 801, while the product recommendations 812 (Product A, Product B, and Product D) are recommended to the user for addressing the less serious Gap 2 802. In addition, the product recommendations 813 (Product A and Product E) are recommended to the user for addressing Gap 3 803, the product recommendations 814 (Product F and Product G) are recommended to the user for addressing Gap 4 804, and the product recommendations 815 (Product H) are recommended to the user for addressing Gap 5 805. By providing a display of product recommendations which reflects the gaps between the user's actual and desired personal imagery, the user can explicitly navigate products that shape their personal imagery in terms of how young or old they are, how masculine or feminine they are, and how upscale or downscale they are To provide additional details for an improved understanding of selected embodiments of the present disclosure, reference is now made to FIG. 9 which depicts a block diagram of a personal brand gap assessment and recommendation system 900 wherein the mechanisms of the illustrative embodiments may be implemented to analyze and compare the user's actual brand personality and an intended or desired brand personality to identify gaps therebetween for purposes of identifying product recommendations for bridging the identified gaps. In doing so, the mechanisms of the illustrative embodiments are able to generate outputs indicating the gaps, e.g., numerical differences or a function, statistical measure, or the like, of such numerical differences, between actual and intended personality of a brand. The output may be used as a basis for generating recommendations for consumer purchases bring the actual brand personality more in line with the intended brand personality, i.e., close the gap or reduce the size of the gap.

Personal Brand Gap Assessment System

The illustrated personal brand gap assessment and recommendation system 900 may be connected to receive inputs which include an actual personality input 910 and an intended personality input 920 which may be measured in different dimensions. For example, the actual personality input 910 can be measured in a first dimension (e.g., n) by a human personality attribute discovery service, such as IBM's Personality Insights service. The intended personality input 920 can be measured in a second, different dimension (e.g., m) which characterizes the user's desire brand with a set of brand personality scales for the user's desired brand which can be inferred and/or reported by the users who can directly input ratings on the scales. However collected, the actual personality input 910 and intended personality input 920 are conveyed to the self-brand gaps detection engine 930 which calculates a degree of singularity of brand personality for both the actual and intended personality inputs 910 and 920 for comparison to identify differences. The differences provide a snapshot as to the instant difference between how a user is actually perceived regarding the user's actual brand personality and how the user intends or desires to be perceived by others. The differences are indicative of a degree, or severity, of disconnect between the user's desired perception and the public's actual perception with regard to the brand personality. These differences may be represented on individual trait basis, groupings of traits, in the aggregate as a global brand personality for the brand, or the like. In addition, the actual personality input data 910 and intended personality input data 920 may be measured over time with time-stamped series data of BPS brand rating values which the self-brand gaps detection engine 930 of the personal brand gap assessment system 900 may use to compute first order and second order derivatives based on the time series data for purposes of detecting the general trend of increasing or decreasing brand metric values based on a comparison of current and previous values of these metrics.

A gap output 940 may be generated that includes identification of the gaps (942) between the user's actual and desired brand personalities 910 and 920 (e.g., the numerical difference between the actual brand personality trait values and the intended brand personality trait values, or a function or statistical measure of such a numerical difference). The gap output 940 may be output as a visualized output of the metrics 942 for feedback and review by the user. In addition, the gap output 940 may be provided to a brand personality perception gap recommendation system 905.

Brand Personality Perception Gap Recommendation System

Figure 9:
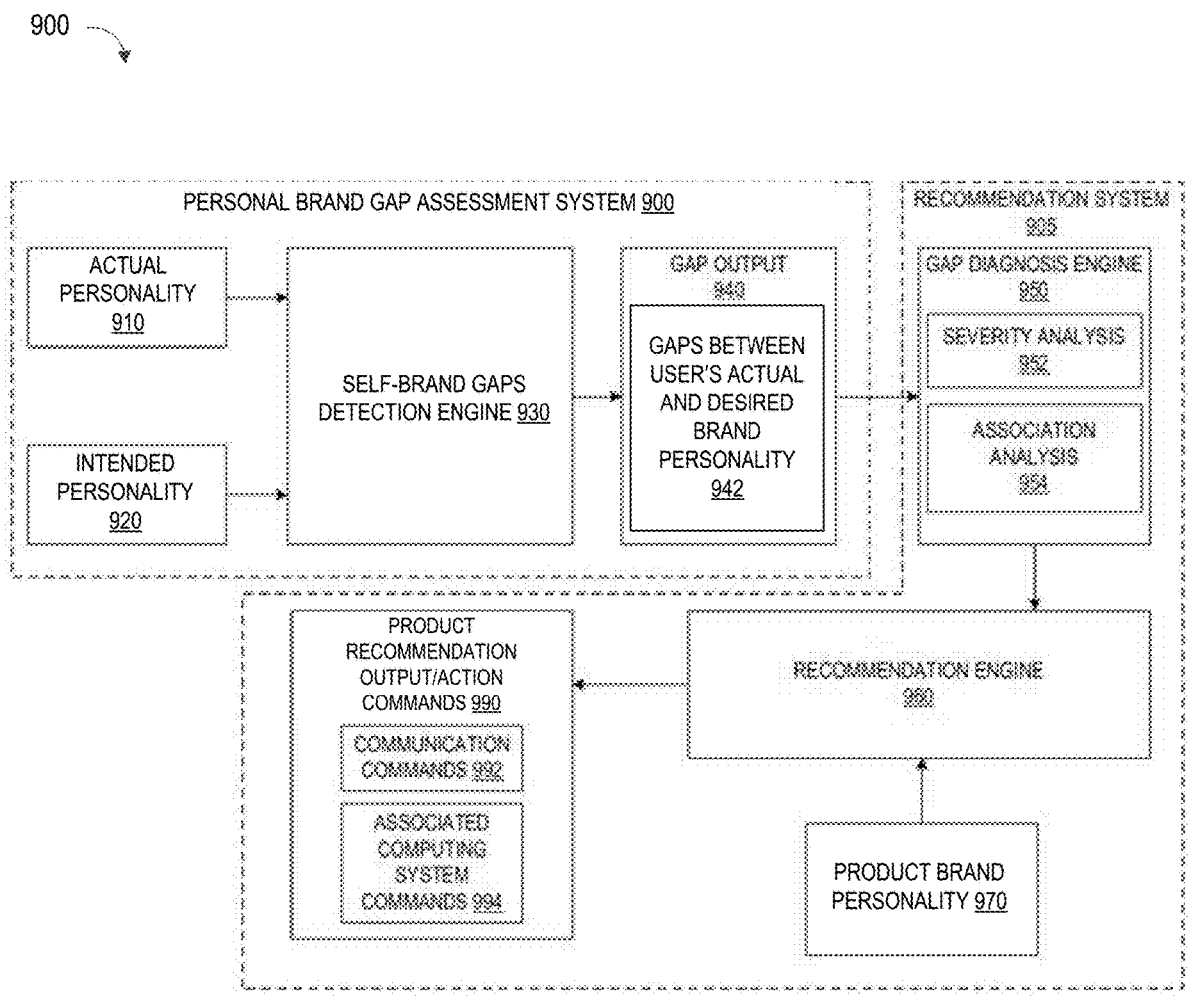
FIG. 9 is an example block diagram illustrating a personal brand gap assessment and recommendation system in accordance with selected embodiments of the present disclosure.

As further shown in FIG. 9, the gap output 940 is provided to a gap diagnosis engine 950 which performs severity analysis 952 and association analysis 954. The severity analysis 952 quantifies the severity of the gap between the actual and intended brand personalities 910 and 920 and further infers possible factors associated with these gaps. A severity rating may be computed for each personality trait, group of personality traits, or the BPS as a whole, by calculating numerical differences of the actual brand personality 910 and the desired brand personality 920, on an individual brand personality trait basis, a principle driving factor basis, a combination of these two, or the like, and correlating the numerical difference to pre-defined severity ratings. A global severity rating for the gaps between the actual and intended brand personalities 910, 920 may be calculated at the severity analysis 952 as a function of the individual severity ratings of the brand personality trait gaps and/or principle driving factor gaps. For example, an average of the severity ratings of the individual brand personality trait gaps may be calculated and used as the global severity rating for gaps associated with the actual brand personality 910 and/or the intended brand personality 920.

As will be appreciated, the severity analysis 952 performed at the gap diagnosis engine 950 may compute and display the severity rating on the user interface 800 as visual representation of the individual trait level gaps 801-805, each having a shading or other visual indication of the relative severity of the gap. In this way, the displayed severity rating indications 801-805 provide a feedback loop between the severity rating and the user's desired self-brand. If the severity rating is too high (e.g., above a specified threshold), indicating that the probability of achieving the desired self-brand is too low, the user can use this rating as feedback to help them adjust their desired self-brand interactively. Once the user adjusts the desired self-brand (e.g., lowers their expectation), the system will take the updated desired self-brand as the input and output the updated severity rating. Another example is that the user can input several desired self-brands to see which one has lower severity rating and has higher probability to achieve. In this way, the system can help users to be more realistic and more likely to improve the use's self-brand(s).

The association analysis 954 assesses relevance factors related to perception gaps. The relevance factors may be, for example, the weightings associated with the principle driving factors or individual brand personality traits provided in the brand personality model. In other illustrative embodiments, factors can be product categories derived from user purchase history. The relevance of a factor related to perception gaps may be computed by the lagged correlation between the principle driving factor and the brand personality traits. The principle driving factor (e.g., measured by the Linguistic Inquiry and Word Count (LIWC) over time) and the brand personality trait rating values over time can be viewed as two time series data sets. The lagged correlation refers to the correlation between two time series shifted in time relative to one another. The higher the correlation means the factor is more relevant.

Based on an evaluation of the severity of the gaps between the actual brand personality 910 and the intended brand personality 920, as well as the identification of the principle driving factors for affecting the predicted or inferred brand personality perceptions, the recommendation engine 960 selects products to be recommended on the basis of identifying product brand personalities 970 which correspond to the identified gaps between the user's actual and desired brand personality. The selection of a recommended product or set of products may be performed, for example, by searching a product database for candidate products associated with the at least one gap based on attributes associated with the candidate product brand personalities and then generating an optimized set of products for bridging the gaps.

The recommendation engine 960 may compose a combination of product recommendations for different identified gaps based on a desired benefit so as to help a user evaluate the benefits of different product recommendations to decide on the right approach for perception improvement. For example, if the user seeks to improve self-brand perception on the trait of "youth," the recommendation engine 960 may output a set of product recommendations along with an identification of the gap being addressed, alone or in combination with an indication of the gap severity and/or the percentage improvement in self-brand perception from the product recommendation. The user may then make an informed decision, based on the provided cost-benefit factors to find an optimal solution for achieving the desired improvement in self-brand imagery.

The generated product recommendation is output 990 for use by a user to review, accept, and/or correct to bring the actual brand personality 910 closer to the desire brand personality 920. As disclosed herein, selected and customized solutions may include communication commands 992 and/or associated computing system commands 994 to be sent to other computing systems, applications, and the like, to initiate the actions recommended to improve the user's actual personal brand 910 such that it more closely resembles that intended brand personality 920. For example, commands may be output as part of the output 990 to other computing systems and/or applications to initiate a product purchase, such as by displaying product recommendation information to the user, opening a product purchase website associated with the product recommendations, printing or outputting coupons for the user, or any other action may be initiated based on commands output as part of the output 990 depending on the particular desired implementation. Thus, the mechanisms of the illustrative embodiments not only improve the operation of the computing systems on which they operate but also perform actions to generate concrete and tangible results outside the computing systems on which the mechanisms of the illustrative embodiments operate.

Figure 10:
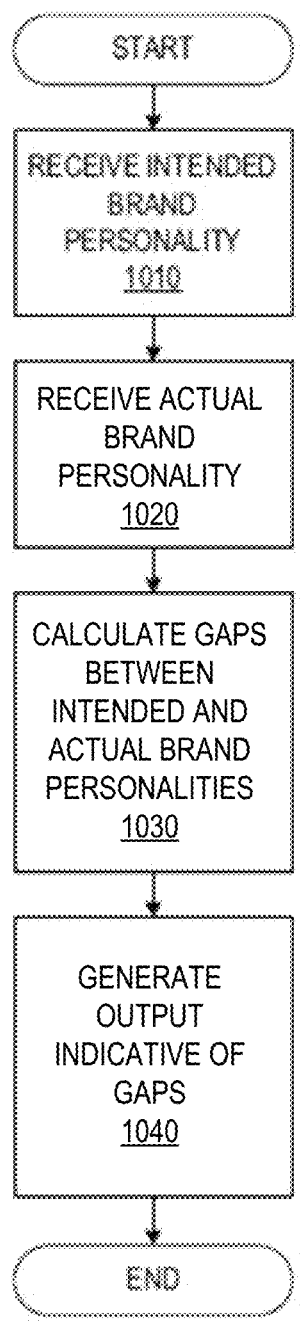
FIG. 10 illustrates a simplified flow chart showing the logic for performing a brand personality gap assessment in accordance selected embodiments of the present disclosure.

FIG. 10 illustrates a simplified flow chart showing the logic for performing a brand personality gap assessment in accordance selected embodiments of the present disclosure. The operation outlined in FIG. 10 may be implemented, for example, by the personal brand gap assessment system 900 in FIG. 9. As shown in FIG. 10, the operation comprises receiving an intended brand personality (step 1010) and an actual brand personality (step 1020). Gaps between the intended and actual brand personalities are calculated (step 1030). A corresponding output is generated that indicates the brand perception gaps (step 1040). The operation then ends or terminates.

Figure 11:
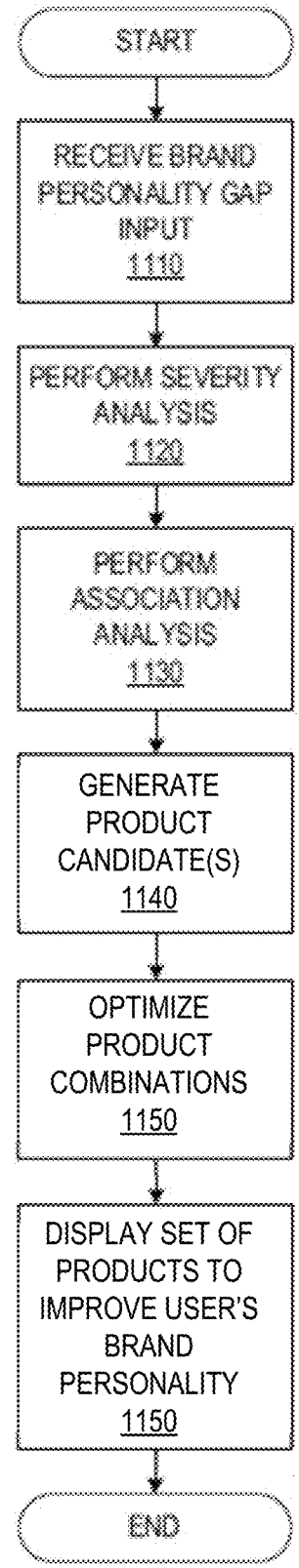
FIG. 11 illustrates a simplified flow chart showing the logic for generating and displaying a brand personality gap recommendation in accordance selected embodiments of the present disclosure.

FIG. 11 illustrates a simplified flow chart showing the logic for generating and displaying a brand personality gap recommendation in accordance selected embodiments of the present disclosure. The operation outlined in FIG. 11 may be performed, for example, by the brand personality perception gap recommendation system 905 in FIG. 9, for example. As shown in FIG. 11, the operation starts with the receiving of a brand personality perception gap input (step 1110). This input may be received, for example, as gap output 940 from personal brand gap assessment system 900 in FIG. 9. Severity analysis is performed on the input to determine a severity of the gap(s) indicated in the input (step 1120). Association analysis is performed on the input to identify the most relevant factors that affect the brand personality perception gaps identified in the input (step 1130). Based on the relevant factors and the severity of the gaps, one or more product candidates are selected from a product database (step 1140) and optimized for purposes of identifying product combinations that are customized to bridge the identified gaps (step 1150). A customized set of products for improving the user's desired brand personality is generated and displayed (step 1150) to provide recommendations for bringing the actual brand personality closer to the desired or intended brand personality. The operation then ends or terminates.

As disclosed herein, illustrative embodiments provide mechanisms for predicting or inferring a brand personality of products based on analysis of crowdsource information and comparing brands to determine relationships between brands, but also provides mechanisms for predicting or inferring user's actual brand personality and desired self-brand personality, as well as determining gaps between the user's actual brand personality and the desired self-brand personality. Moreover, the mechanisms of the illustrative embodiments further provide for generating one or more product recommendation solutions to bridge these gaps. As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

By now, it will be appreciated that there is disclosed herein a system, method, apparatus, and computer program product for enabling personal branding at an information handling system having a processor and a memory. As disclosed, the system, method, apparatus, and computer program receive product information from a set of products, where the product information may include product descriptions, product categories, review ratings, and discussions related to the products on social media. In addition, user information is received from one or more users which may include behavior data collected from social media and personal devices associated with the one or more users. In selected embodiments, the information handling system also receives a desired self-brand for the first user which is selected from a set of representative self-brands, such as by collecting survey answer data for a desired self-brand survey from one or more users, training a self-brand prediction model using the survey answer data and received user information to generate a trained model output, and then generating the set of representative self-brands via clustering the survey answer data and the trained model output for display and selection by the first user. Subsequently, the information handling system may use a natural language processing (NLP) computer system to analyze the user information to identify an actual self-brand and a desired self-brand for a first user, and to calculate one or more gaps between the actual self-brand and the desired self-brand for the first user. In selected embodiments, the user information may be analyzed by establishing a mapping between a human personality and a brand personality measure, calculating a human personality measure for the first user, transforming the human personality measure for the first user to the actual self-brand for the first user based on the mapping so as to be in a shared dimensional space with the desired self-brand for the first user, and then calculating at least one gap value between the actual self-brand and a desired self-brand for the first user. In selected embodiments, the mapping between the human personality and the brand personality measure may be established collecting purchase history data and behavior data from a plurality of users, computing product brand personality data for products purchased by the plurality of users, computing human personality data for the plurality of users, and applying the human personality data and the products brand personality data to a model to learn mapping coefficients for the mapping between the human personality and the brand personality measure. In selected embodiments, the computation of the product brand personality data may be performed at the information handling system by collecting survey data regarding product brand personality at a product level along with corresponding product information from a small set of products; and the training one or more predictive models to predict a product's perceived brand personality from product information for the product. In addition, the information handling system may analyze the product information to identify a product brand personality for each product in the set of products. As a result of this analysis, the information handling system may output visual information identifying the one or more gaps along with a set of product recommendations having corresponding product brand personalities to bridge the one or more gaps between the actual self-brand and the desired self-brand for the first user. In selected embodiments, the information handling system may output the set of product recommendations by searching a product database for candidate products associated with the one or more gaps, and then generating an optimized set of products for bridging one or more gaps. In selected embodiments, the information handling system may search the product database by computing a product brand personality for each product in the product database, computing a distance between each product brand personality and the desired self-brand for the first user, and then generating a pool of product candidates based on the distance. In other embodiments, the information handling system may generate the optimized set of products by optimizing a set of products by considering the product brand personality for each product in the product database along with interaction effects of between said product brand personalities.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of enabling personal branding, the method comprising:
   receiving, by the information handling system comprising a processor and a memory, product information for a set of products, the product information comprising product descriptions, product categories, review ratings, and discussions related to the products on social media;
   receiving, by the information handling system, user information from one or more users, the user information comprising user behavior data collected from social media and personal devices associated with the one or more users;
   analyzing, by the information handling system, the user information to identify an actual self-brand and a desired self-brand for a first user and to calculate one or more gaps between the actual self-brand and the desired self-brand for the first user;
   analyzing, by the information handling system, the product information to identify a product brand personality for each product in the set of products; and
   outputting, by the information handling system, visual information identifying the one or more gaps between the actual self-brand and the desired self-brand for the first user along with a set of product recommendations having corresponding product brand personalities to bridge the one or more gaps between the actual self-brand and the desired self-brand for the first user.

2. The method of claim 1, where analyzing the user information comprises:
    establishing a mapping between a human personality and a brand personality measure;
    calculating, by the information handling system, a human personality measure for the first user;
    transforming, by the information handling system, the human personality measure for the first user to the actual self-brand for the first user based on the mapping so as to be in a shared dimensional space with the desired self-brand for the first user; and
    calculating, by the information handling system, at least one gap value between the actual self-brand and a desired self-brand for the first user.

3. The method of claim 2, where establishing the mapping between the human personality and the brand personality measure comprises:
    collecting, by the information handling system, purchase history data and behavior data from a plurality of users;
    computing, by the information handling system, product brand personality data for products purchased by the plurality of users;
    computing, by the information handling system, human personality data for the plurality of users; and
    applying, by the information handling system, the human personality data and the products brand personality data to a model to learn mapping coefficients for the mapping between the human personality and the brand personality measure.

4. The method of claim 3, where computing product brand personality data comprises:
    collecting, by the information handling system, survey data regarding product brand personality at a product level along with corresponding product information from a small set of products; and
    training, by the information handling system, one or more predictive models to predict a product's perceived brand personality from product information for the product.

5. The method of claim 1, where outputting the set of product recommendations comprises:
    searching, by the information handling system, a product database for candidate products associated with the one or more gaps; and
    generating, by the information handling system, an optimized set of products for bridging one or more gaps.

6. The method of claim 5, where searching the product database for candidate products comprises:
    computing, by the information handling system, a product brand personality for each product in the product database;
    computing, by the information handling system, a distance between each product brand personality and the desired self-brand for the first user; and
    generating, by the information handling system, a pool of product candidates based on the distance.

7. The method of claim 5, where generating the optimized set of products comprises optimizing a set of products by considering the product brand personality for each product in the product database along with interaction effects of between said product brand personalities.

8. The method of claim 1, further comprising predicting, by the information handling system, a desired self-brand for the first user based on user information for the first user.

9. The method of claim 1, where outputting visual information comprises displaying, by the information handling system, a severity rating for each of the one or more gaps.

10. A computer program product comprising a computer readable storage medium having a computer readable program stored therein, wherein the computer readable program, when executed on an information handling system, causes the system to recommend one or more products to bridge gaps between desired and actual personal branding by:
    receiving user information from one or more users, the user information comprising user behavior data collected from social media and personal devices associated with the one or more users;
    analyzing the user information to identify an actual self-brand and a desired self-brand for a first user and to calculate one or more gaps between the actual self-brand and the desired self-brand for the first user;
    analyzing the product information to identify a product brand personality for each product in the set of products; and
    outputting visual information identifying the one or more gaps between the actual self-brand and the desired self-brand for the first user along with a set of product recommendations having corresponding product brand personalities to bridge the one or more gaps between the actual self-brand and the desired self-brand for the first user.

11. The computer program product of claim 10, wherein the computer readable program, when executed on the system, causes the system to analyze the user information by:
    establishing a mapping between a human personality and a brand personality measure;
    calculating a human personality measure for the first user;
    transforming the human personality measure for the first user to the actual self-brand for the first user based on the mapping so as to be in a shared dimensional space with the desired self-brand for the first user; and
    calculating at least one gap value between the actual self-brand and a desired self-brand for the first user.

12. The computer program product of claim 10, wherein the computer readable program, when executed on the system, causes the system to output the set of product recommendations by:
    searching a product database for candidate products associated with the one or more gaps; and
    generating an optimized set of products for bridging one or more gaps.

13. The computer program product of claim 10, wherein the computer readable program, when executed on the system, causes the system to predict a desired self-brand for the first user based on user information for the first user.

14. The computer program product of claim 10, wherein the computer readable program, when executed on the system, causes the system to receive a desired self-brand for the first user which is selected from a set of representative self-brands.

15. The computer program product of claim 10, wherein the computer readable program, when executed on the system, causes the system to output visual information by displaying, by the information handling system, a severity rating for each of the one or more gaps.

16. An information handling system comprising:
    one or more processors;
    a memory coupled to at least one of the processors;

a set of instructions stored in the memory and executed by at least one of the processors to recommend one or more products to bridge gaps between desired and actual personal branding, wherein the set of instructions are executable to perform actions of:

receiving, by the system comprising a processor and a memory, product information for a set of products, the product information comprising product descriptions, product categories, review ratings, and discussions related to the products on social media;

receiving, by the system, user information from one or more users, the user information comprising user behavior data collected from social media and personal devices associated with the one or more users;

analyzing, by the system, the user information to identify an actual self-brand and a desired self-brand for a first user and to calculate one or more gaps between the actual self-brand and the desired self-brand for the first user;

analyzing, by the system, the product information to identify a product brand personality for each product in the set of products; and outputting, by the system, visual information identifying the one or more gaps between the actual self-brand and the desired self-brand for the first user along with a set of product recommendations having corresponding product brand personalities to bridge the one or more gaps between the actual self-brand and the desired self-brand for the first user.

17. The information handling system of claim 16, where analyzing the user information comprises:
establishing a mapping between a human personality and a brand personality measure;
calculating a human personality measure for the first user;
transforming the human personality measure for the first user to the actual self-brand for the first user based on the mapping so as to be in a shared dimensional space with the desired self-brand for the first user; and
calculating at least one gap value between the actual self-brand and a desired self-brand for the first user.

18. The information handling system of claim 16, where outputting the set of product recommendations comprises:
searching, by the information handling system, a product database for candidate products associated with the one or more gaps; and
generating, by the information handling system, an optimized set of products for bridging one or more gaps.

19. The information handling system of claim 16, wherein the set of instructions are executable to predict a desired self-brand for the first user based on user information for the first user.

20. The information handling system of claim 16, wherein the set of instructions are executable to receive a desired self-brand for the first user which is selected from a set of representative self-brands.

21. The information handling system of claim 16, wherein the set of instructions are executable to display a severity rating for each of the one or more gaps.

* * * * *